3,723,351
CATALYST FOR ELEVATED TEMPERATURES
William H. Flank, Broomall, James E. McEvoy, Springfield, and John R. Stuart, deceased, by Clara M. Stuart, successor, Brookhaven, Pa., assignors to Air Products and Chemicals, Inc., Philadelphia, Pa.
No Drawing. Continuation-in-part of application Ser. No. 693,733, Dec. 27, 1967. This application Jan. 25, 1971, Ser. No. 109,639
Int. Cl. B01j 11/40
U.S. Cl. 252—454
10 Claims

ABSTRACT OF THE DISCLOSURE

Catalyst carrier particles having a low surface area open pore structure, and low density and consisting of calcium sodium alumino disilicate foam and having a non-zeolitic crystalline structure are prepared by heating precursor pellets at about 900–1150° C. for several minutes. A zeolitic sodium alumino disilicate of a type called Zeolite A is prepared by refluxing meta kaolin in 10% sodium hydroxide solution or by any other Zeolite A synthesis. Such sodium zeolite is at least 50% ion-exchanged to the calcium form to provide said precursor pellets. The ceramic foam particles are impregnated with a liquid containing a metal component. Thereafter the impregnated particle is heated to bond the catalytic metal to the foamed ceramic particle. Such particles comprising catalytic metal components on ceramic foam are catalysts for reactions conducted at elevated temperatures, comprising hydrolysis of hydrocarbonaceous material, oxidation reactions, and hydrogenative aromatization of hydrocarbonaceous materials.

CROSS-REFERENCE TO RELATED APPLICATIONS

This application is in part a continuation of Ser. No. 693,733 filed Dec. 27, 1967, maturing as U.S. Pat. No. 3,574,647 on Apr. 13, 1971, all of the disclosure of which is deemed here reiterated. This application contains subject matter in common with an application being filed concurrently entitled "Calcium Sodium Alumino Disilicate Foam," Ser. No. 109,638 filed Jan. 25, 1971, all of the disclosure of which is deemed here reiterated.

BACKGROUND OF THE INVENTION

Field of the invention

This invention relates to catalysts consisting of aluminosilicate support and at least one catalytic metal component.

Prior art

Some minerals such as perlite, vermiculite and the like, have been heated at conditions providing inorganic foam. Other minerals and glasses have been expanded by suitable processing steps such as the steam blowing of molten rock, to prepare inorganic foam. The marketing of inorganic foam has emphasized end uses such as sound insulation, cushioning materials, thermal insulation, and the saving of weight of filling space with inorganic material. Prior literature suggests that some inorganic foams be utilized as sorptive agents for selective sorption of gaseous components and/or as supports for catalysts, but the inorganic foams have had an abundance of failures because competitive materials have offered better performance. It has generally been the practice to prepare a catalyst for a high temperature reaction from the combination of a metal oxide and a high purity chemical support. High purity alumina and high purity silica are examples of the matrix which has been successfully employed as a support for a metal oxide component for a catalyst for an elevated temperature reaction.

SUMMARY OF THE INVENTION

In accordance with the present invention, a catalyst particle for an elevated temperature reaction is prepared by impregnating a liquid containing a catalytic metal component into a support particle consisting of a foamed crystalline calcium sodium alumino disilicate particle and thereafter heating the impregnated particle to bond the catalytic metal component (e.g. oxide, halide, or sulfide of a transitional metal) to the particle. The foamed crystalline calcium sodium alumino disilicate particle is prepared by heating a Zeolite A type of calcium sodium alumino disilicate for several minutes in the 900°–1150° C. range.

Example 1

Meta kaolin powder is refluxed with 10% aqueous sodium hydroxide in accordance with Kumins et al. 2,544,695, and the recovered powder is dried and compressed into zeolite pellets consisting essentially of sodium alumino disilicate. These pellets are ion-exchanged with a solution of calcium chloride to provide calcium sodium alumino disilicate pellets. Measurable amounts of sodium remain in the product because of the conventional incompleteness of routine procedures for ion exchange of crystalline zeolites. Synthetic zeolites are generally identified by the cation occupying most of the ion exchange sites without referring to less abundant cations. As mol percent of ion exchange capacity, the pellets are about 51–90% Ca and about 10–49% $Na_2O$, desirably at least 70% Ca. Said pellets of calcium sodium alumino disilicate are heated during about 30 minutes to about 1100° C. and maintained at about 1100° C. for about 10 minutes to provide ceramic foam particles. Each foamed particle has a volume of approximately four times the volume of the initial calcium sodium alumino disilicate pellet. The foamed calcium sodium alumino disilicate pellets contain the same ratio of Ca to Na ions as the pellets before heating. The foamed pellets have a bulk density of from about 8 to 19 lbs./ft.$^3$ or from about 0.13 g./cc. to about 0.3 g./cc. The surface area is approximately 2 m.$^2$/g. The pore size distribution shows about 75% of the pore volume consists of pores with diameters so large that they are measured in microns instead of in angstroms. Most of the pores are of a size in the 5 to 30 micron range. The pore volume is about 5 cc./g., or about 10 times that of some alumina carriers. When the foam pellet is heated for 24 hours at about 1090° C., the shrinkage is only 0.3% and when the same 24-hour test is applied at a still higher temperature of 1260° C., the shrinkage is of the magnitude of 0.6%. The crushing strength of the pellets is about 10 lbs. The particles have a specific heat of about 0.224 B.t.u./lb.

The foamed calcium sodium aluminodisilicate was pulverized and the powder subjected to standard X-ray diffraction procedures to provide the following data:

TABLE A

| $d$, A.: | $I/I_o$ |
|---|---|
| 8.63 | 12 |
| 4.98 | 19 |
| 4.31 | 16 |
| 4.19 | 33 |
| 4.04 | 23 |
| 3.85 | 51 |
| 3.76 | 16 |
| 3.63 | 14 |
| 3.36 | 14 |
| 3.26 | 65 |
| 3.19 | 100 |
| 3.13 | 16 |
| 3.04 | 19 |
| 3.00 | 70 |
| 2.88 | 30 |
| 2.57 | 19 |
| 2.51 | 14 |
| 2.30 | 26 |
| 2.14 | 14 |
| 2.09 | 21 |
| 2.08 | 19 |

Such X-ray data suggest either a mixture possibly comprising nepheline, plagioclase and anorthite, or possibly a unique single crystalline species having no name other than foamed calcium sodium aluminodisilicate.

Catalyst for a catalytic muffler is prepared by impregnating oxides of copper and chromium (desirably in a mol ratio of about 3 to 1, thus being different from some of the copper chromite catalysts employed for hydrogenation reactions and closer to the proportions of a basic cupric chromate) into the foamed calcium sodium aluminosilicate pellets. A solution containing about 0.1 molar ammonium dichromate is first impregnated into the pellets, which are dried and then impregnated with a hot solution of 0.6 molar cupric nitrate. In each case, the impregnating solution has a volume which is only about 90% of the water saturation volume of the pellets, thus avoiding any excess solution. After calcination, the basic cupric chromate is firmly bonded to the ceramic foam matrix.

Supplemental particles are prepared by impregnating about 0.1% palladium chloride into calcium aluminodisilicate foam particles, and calcining. The catalytic muffler is loaded with a mixture of about 95% basic cupric chromate catalyst pellets, and uniformly distributed amongst them, about 5% of the palladium catalyst pellets. When the engine is cold, the palladium catalyst particles assume a significant portion of the burden of promoting combustion of pollutants, while permitting the basic copper chromate catalyst to assert a major role after normal operating conditions are attained.

The catalytic muffler is employed in a stationary engine employed to operate a stand-by generator and discharges an exhaust having minimized pollutants in a zone such as a hospital, residential area, or the like.

Examples 2–7

A supply of catalyst support pellets was prepared by converting pellets of calcium Zeolite A to ceramic foam particles by heating at about 1050° C. for about 20 minutes following the procedure of Example 1. A series of oxidation catalysts is prepared by impregnating a nitrate or ammonium salt of a metal into the ceramic foam pellet, and heating the impregnated pellet in a stream of $H_2$ at about 300° C. to decompose the decomposable ion and thus provide a catalyst comprising a metal and/or metal oxide. In some cases, as with noble metals, the catalytic component is at some stage in the metallic state, but some of the metals are in the oxide state when employed as catalysts in vapor phase oxidations. The catalytic activity of the metal or metal oxide appears to be enhanced by the ceramic foam matrix. Data relating to the examples are in Table I.

TABLE I

| Example No. | Salt | Oxide | Reactant | Product |
|---|---|---|---|---|
| 2 | $(NH_4)VO_3$ | $V_2O_5$ | $SO_2$ | $SO_3$ |
| 3 | $(NH_4)_2MoO_4$ | $MoO_3$ | $CH_2OH$ | $CH_2O$ |
| 4 | $(NH_4)_2CrO_4$ | $CrO_3$ | $CH_3C_6H_5$ | $C_6H_5CO_2H$ |
| 5 | $Bi(NO_3)_3$ | $Bi_2O_3$ | $C_3H_6$ | $C_2H_3CO_2H$ |
| 6 | $Pd(NO_3)_2$ | Pd | $H_2$ | $H_2O$ |
| 7 | $Mn(NO_3)_2$ | MnO | CO | $CO_2$ |

The superior effectiveness of the ceramic foam as a matrix for oxidation catalysts is an unobvious departure from prior art teachings, inasmuch as it shares few characteristics with conventional supports for oxidation catalysts, and inasmuch as heretofore calcium aluminosilicates generally have been of very limited usefulness as catalyst supports. The ceramic foam pellets have attrition resistance favoring their effectiveness in catalytic mufflers and can be effective in reducing auto exhaust pollutants in addition to burning the carbon monoxide identified with the catalyst comprising manganese oxide. The desired process conditions affect the optimum choice of metal oxide, and the examples illustrate only a few of the catalysts featuring the advantageous support and suitable for use throughout a wide temperature range, including elevated temperatures. The catalyst featuring palladium on calcium aluminodisilicate foam of Example 6 is effective in the hydrogenative aromatization of cyclohexane to benzene at about 900° F., and is particularly suited for hydrogenative aromatization of organic materials at temperatures in the 800–1500° F. range. Any of the aromatization catalysts featuring the calcium sodium aluminodisilicate foam matrix can withstand a long series of cycles of oxidative regeneration and aromatization in the presence of excess hydrogen.

Example 8

Finely divided powder having about 2% palladium on high surface area alumina is prepared and a dispersion of the powder in distilled water is prepared. Foamed pellets of calcium sodium aluminodisilicate corresponding to the precursor of Example 1 herein are impregnated with the dispersion to provide particles containing, on the calcined basis, about 0.2% palladium. The impregnated particles are calcined to bond the palladium to the aluminodisilicate foam and to provide catalyst particles comprising palladium. Although the powder was initially in an aqueous dispersion, the palladium and alumina of the powder are firmly secured to the carrier after calcination, as has been true of other supported catalysts prepared by impregnation of an aqueous suspension of the catalytically active components with or without high area ceramic components. This procedure illustrates preparation of a catalyst by impregnating the novel carrier with a liquid containing a catalytic metal component and thereafter calcining the impregnated carrier particle to bond the catalytic metal component to the carrier. The calcined particles are cooled to provide a palladium on calcium sodium aluminodisilicate catalyst. Although a minor amount of alumina is thus impregnated into the catalyst, the ceramic support can be treated as if it were an aluminodisilicate in which the molar ratio of silica to alumina continues to be about 2 to 1. The thus prepared catalyst particles containing about 0.2% palladium are employed to catalyze the oxidation of automobile emissions. The combination of activity, selectivity, and stability of the catalyst indicates its suitability for use as an automobile emission catalyst. The low bulk density of the calcium sodium aluminodisilicate permits it to be heated to operating temperature rapidly. Initiation of reaction at low temperatures is thus facilitated. A remarkable advantage of the catalyst was its ability to promote combustion of carbon monoxide at a temperature below 250° C. Aqueous dispersions of ceramic materials or their precursors, such as magnesia, zirconia, silica, titania and/or appropriate mixtures are suitable instead of alumina. Such particles may be associated with palladium nitrate to provide about 2% palladium on the inorganic particles prior to impregnation into the foamed calcium sodium aluminodisilicate.

Example 9

Carrier pellets are prepared by calcining calcium Zeolite A within the 900–1150° C. range for at least 10 minutes. An iron molybdate catalyst is prepared by first impregnating a ferric formate solution into such ceramic foam pellets. An intermediate calcination decomposes the formate, leaving iron oxide deposited on the ceramic foam. This intermediate material is impregnated with ammonium molybdate and again calcined. The catalyst consists of 51.1% $MoO_3$, 7.0% $Fe_2O_3$ and 41.9% ceramic foam support. The molybdate to iron oxide unit weight ratio is 7.3.

The catalyst was evaluated in a process for oxidizing methanol to formaldehyde at a space velocity of about 7000 volumes of reactant per volume of catalyst per hour. The reactant stream contained about 8.8% by volume methanol and the $O_2/CH_3OH$ unit mol ratio was about 2.2. The mol percent selectivity was essentially 100%, so that mol percent conversion and mol percent yield were the same. The effect of temperature upon conversion was noted as follows:

| °F.: | Mol percent yield |
|---|---|
| 685 | 55.4 |
| 725 | 55.9 |
| 800 | 64.7 |
| 840 | 65.5 |

The catalyst was thus shown to have measurable activity for the methanol oxidation reaction.

Example 10

An iron molybdate on said foamed calcium sodium alumino disilicate catalyst, prepared by the general procedure of Example 18, contained 9.6% $Fe_2O_3$ instead of 7.0%, so that the $MoO_3/Fe_2O_3$ unit weight ratio was 5.3 instead of 7.3. Data relating to formaldehyde syntheses are as follows:

| °F. | GHSV | Percent MeOH in feed | Mol percent conv. | Mol percent selec. | Mol percent yield |
|---|---|---|---|---|---|
| 710 | 7,000 | 8.8 | 66.2 | 100 | 66.2 |
| 790 | 3,300 | 7.4 | 69 | 100 | 69 |
| 840 | 3,000 | 8.8 | 83.5 | 89.6 | 74.8 |
| 775 | 3,000 | 6.6 | 58 | 100 | 58 |
| 775 | 3,000 | 10.1 | 65 | 100 | 65 |
| 825 | 3,000 | 9.7 | 82.2 | 100 | 82.2 |
| 835 | 3,000 | 8.1 | 88.4 | 99.7 | 88.0 |
| 860 | 3,000 | 8.0 | 91 | 100 | 91 |

The iron molybdate on ceramic foam catalyst was shown to have effectiveness in oxidizing methanol throughout a range from 710 to 860° F.

Example 11

A solution of nickel formate is impregnated into foamed pellets of calcium sodium aluminodisilicate prepared as the precursor of Example 1. The impregnated catalyst is heated in a hydrogen stream and then employed for the hydrolysis of methane to synthesis gas comprising carbon monoxide and hydrogen. The catalyst withstands the elevated temperature and has an advantageous combination of activity, selectivity and stability characteristics superior to some previously proposed catalysts for this reaction. Various modifications of active components for such a synthesis gas catalyst are appropriate without losing the advantages of the foamed calcium sodium aluminodisilicate support.

By a series of tests it is established that the foamed support particle, prior to incorporation of the catalytic metal component, must consist essentially of non-zeolitic synthetic calcium sodium aluminodisilicate, the proportions being 50–90% CaO and 10–50% $Na_2O$ per mole of alumina in the aluminodisilicate, said calcium sodium aluminodisilicate having a bulk density of less than 0.3 kilogram per liter and having structural strength and rigidity, said calcium sodium aluminodisilicate comprising a plurality of uniformly distributed interconnected open pores contributing a porosity of at least 75 volume percent, the pores having diameters from about 5 to about 30 microns contributing about 75% of the porosity, said calcium sodium aluminodisilicate having a surface area of less than about 5 square meters per gram, and an initial fusion temperature of at least 1250° C.

What is claimed is:

1. The method of preparing catalyst for reaction at an elevated temperature, which method includes the steps of:
    preparing sodium Zeolite A type of sodium aluminodisilicate
    subjecting the sodium aluminodisilicate to ion exchange with a solution of a calcium salt to prepare calcium sodium aluminodisilicate, said calcium sodium aluminodisilicate being of granular particle size and corresponding to the composition $$(CaO)_{0.5-0.9} \cdot (Na_2O)_{0.1-0.5} \cdot Al_2O_3 \cdot 2SiO_2 \cdot yH_2O$$

converting granular particles of said calcium sodium aluminodisilicate to porous granular particles of foamed crystalline calcium sodium aluminodisilicate by heating at a temperature within the range of 850° C. to 1200° C. for a time of at least 10 minutes;
    impregnating the foamed granular particles with a liquid containing catalytic component comprising at least one transitional metal selected from the group consisting of copper, chromium, vanadium, molybdenum, bismuth, platinum, palladium, manganese, iron and nickel;
    heating the impregnated particles in a gas stream at conditions bonding the catalytic component to the particle, thereby providing a catalytic component distributed in and on the foamed crystalline calcium sodium aluminodisilicate support; and
    cooling the granular particles, said cooled granular particles being adapted for use as catalyst for reaction at an elevated temperature.

2. The method of claim 1 in which the catalyst contains a catalytic component effective in hydrogenative aromatization of organic material.

3. The method of claim 1 in which the catalyst comprises catalytic component effective in the hydrolysis of methane to synthesis gas.

4. The method of claim 1 in which the catalyst comprises catalytic component effective for an oxidative reaction.

5. A catalyst comprising a support consisting essentially of non-zeolitic synthetic foamed crystalline calcium sodium aluminodisilicate, the proportions being 50–90% CaO and 10–50% $Na_2O$ per mole of alumina in the aluminodisilicate, said calcium sodium aluminodisilicate having a bulk density of less than 0.3 kilogram per liter and having structural strength and rigidity, said calcium sodium aluminodisilicate comprising a plurality of uniformly distributed interconnected open pores contributing a porosity of at least 75 volume percent, the pores having diameters from about 5 to about 30 microns contributing about 75% of the porosity, said calcium sodium aluminodisilicate having a surface area of less than about 5 square meters per gram, and an initial fusion temperature of at least 1250° C., said catalyst having bonded to said support a catalytic component comprising at least one transitional metal selected from the group consisting of copper, chromium, vanadium, molybdenum, bismuth, platinum, palladium, manganese, iron and nickel distributed in and on the foamed crystalline calcium sodium aluminodisilicate support.

6. The catalyst of claim 5 in which the presence of the foamed crystalline calcium sodium aluminodisilicate is evidenced by an X-ray diffraction pattern essentially corresponding to Table A.

7. A catalyst in accordance with claim 6 promoting the initiation of combustion of carbon monoxide in emissions from an internal combustion engine at a temperature below 250° C.

8. A catalyst of claim 7 in which a catalytic component is associated with a high surface area metal oxide, selected from the group consisting of alumina, magnesia, zirconia, silica and titania, secured to the foamed calcium sodium aluminodisilicate support.

9. A method of preparing a catalyst of claim 8 which includes the steps of associating alumina and at least one catalytic component, impregnating foamed crystalline calcium sodium aluminodisilicate with a liquid containing the associated alumina and catalytic component, heating the impregnated calcium sodium aluminodisilicate to provide at least one catalytic component distributed in and on the foamed crystalline calcium sodium aluminodisilicate, and cooling the heated foamed crystalline calcium sodium aluminodisilicate.

10. The method of claim 9 in which about 0.2% palladium is impregnated into the foamed calcium sodium aluminodisilicate.

References Cited
UNITED STATES PATENTS

| | | | |
|---|---|---|---|
| 3,574,647 | 4/1971 | Flank et al. | 23—111 X |
| 3,396,112 | 8/1968 | Burrows | 252—382 X |
| 3,440,181 | 4/1969 | Olstowski | 252—62 |
| 3,497,455 | 2/1970 | Ahr | 252—62 |
| 3,594,310 | 7/1971 | Pollitzer | 252—455 Z |

CARL F. DEES, Primary Examiner

U.S. Cl. X.R.

252—455 R, 455 Z